US012233846B2

(12) United States Patent
Sukegawa et al.

(10) Patent No.: US 12,233,846 B2
(45) Date of Patent: Feb. 25, 2025

(54) HYBRID VEHICLE CONTROL DEVICE

(71) Applicant: Hitachi Astemo, Ltd., Hitachinaka (JP)

(72) Inventors: Yoshihiro Sukegawa, Tokyo (JP); Masayuki Saruwatari, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 687 days.

(21) Appl. No.: 17/413,785

(22) PCT Filed: Feb. 5, 2020

(86) PCT No.: PCT/JP2020/004245
§ 371 (c)(1),
(2) Date: Jun. 14, 2021

(87) PCT Pub. No.: WO2020/179327
PCT Pub. Date: Sep. 10, 2020

(65) Prior Publication Data
US 2022/0009479 A1  Jan. 13, 2022

(30) Foreign Application Priority Data

Mar. 4, 2019 (JP) ................................ 2019-038217

(51) Int. Cl.
*B60W 20/20* (2016.01)
*B60W 20/40* (2016.01)
(52) U.S. Cl.
CPC ............ *B60W 20/20* (2013.01); *B60W 20/40* (2013.01); *B60W 2510/0638* (2013.01); *B60W 2710/0666* (2013.01)
(58) Field of Classification Search
CPC .... B60W 10/024; B60W 10/06; B60W 10/08; B60W 10/10; B60W 20/00; B60W 20/40;
(Continued)

(56) References Cited

U.S. PATENT DOCUMENTS 11,225,923 B2 * 1/2022 Hashimoto ......... F02D 41/2451
11,268,467 B2 * 3/2022 Hashimoto ......... F02D 41/2454
(Continued)

FOREIGN PATENT DOCUMENTS

JP       7-253034 A    10/1995
JP    2007-22296 A     2/2007
(Continued)

OTHER PUBLICATIONS

International Search Report (PCT/ISA/210) issued in PCT Application No. PCT/JP2020/004245 dated Jun. 2, 2020 with English translation (five (5) pages).
(Continued)

*Primary Examiner* — John Kwon
(74) *Attorney, Agent, or Firm* — Crowell & Moring LLP

(57) ABSTRACT

Provided is a hybrid vehicle control device excellent in quietness while suppressing knocking within an allowable limit. The hybrid vehicle control device of an aspect of the invention is a hybrid vehicle control device that controls a hybrid vehicle including a motor that drives wheels, a generator that supplies electric power to the motor, and an engine configured by an internal combustion engine that drives the generator, and includes a control unit that calculates a knock index value indicating a knock degree of the engine at an engine operating point represented by a relationship between an engine rotational speed and an engine torque, and controls the engine rotational speed and the engine torque based on the knock index value. As the knock index value decreases, the control unit sets the target engine rotation speed to be lower and the target engine torque to be higher in the target power generation amount.

9 Claims, 16 Drawing Sheets

(58) Field of Classification Search
CPC ............... B60W 20/17; B60W 20/20; B60W 2510/0638; B60K 4/46
See application file for complete search history.

(56) References Cited

U.S. PATENT DOCUMENTS

| | | |
|---|---|---|
| 2009/0088913 A1 | 4/2009 | Oyama et al. |
| 2009/0265075 A1 | 10/2009 | Niimi |
| 2014/0172280 A1* | 6/2014 | Ogata ............... F02D 13/0242 701/111 |
| 2016/0194007 A1* | 7/2016 | Furuya .............. B60W 50/0097 477/166 |
| 2017/0001623 A1* | 1/2017 | Kim ........................ B60L 58/12 |
| 2017/0282901 A1* | 10/2017 | Imamura ............... B60W 10/06 |
| 2022/0009479 A1* | 1/2022 | Sukegawa ............. B60W 20/20 |
| 2022/0024437 A1* | 1/2022 | Gosala .................. B60W 10/08 |

FOREIGN PATENT DOCUMENTS

| | | |
|---|---|---|
| JP | 2008-22671 A | 1/2008 |
| JP | 2009-257232 A | 11/2009 |
| JP | 2009-262753 A | 11/2009 |

OTHER PUBLICATIONS

Japanese-language Written Opinion (PCT/ISA/237) issued in PCT Application No. PCT/JP2020/004245 dated Jun. 2, 2020 (four (4) pages).

* cited by examiner

HYBRID VEHICLE CONTROL DEVICE

TECHNICAL FIELD

The present invention relates to a hybrid vehicle control device, and particularly to a technique for controlling an engine in consideration of quietness.

BACKGROUND ART

In recent years, in vehicles such as automobiles, regulations on fuel consumption (fuel efficiency) and exhaust gas harmful components have been strengthened, and such regulations tend to be further strengthened in the future. In particular, regulations on fuel efficiency are matters of great interest due to problems such as fuel price increase, influence on global warming, and energy resource depletion.

Under such circumstances, a hybrid vehicle that supplies electric power generated by an engine to a motor to drive an axle is known. In the hybrid system, the engine can avoid operation at low load and low rotation speed with low thermal efficiency, and the thermal efficiency of the entire system can be increased. An example of such a hybrid system is disclosed in, for example, PTL 1.

PTL 1 describes "means for detecting knocking of the engine; and means for increasing and correcting a target value of the engine rotation speed when knocking is detected". Further, PTL 1 describes "when the detected rotation speed of the engine is on a lower side than a predetermined control target range, the field current of the generator is corrected to be a smaller value, and on the contrary when on a higher side, to be a larger value", and "when the detected rotation speed of the engine is within a predetermined control target range, the operation condition of the engine is corrected such that the load of the engine becomes higher if the detected power generation amount of the generator is on a smaller side than a predetermined control target range, and on the contrary if on a larger side, the load of the engine becomes lower, so that the rotation speed of the engine and the power generation amount of the generator both fall within the control target range".

CITATION LIST

Patent Literature

PTL 1: JP 7-253034 A

SUMMARY OF INVENTION

Technical Problem

Meanwhile, in a hybrid system, it is necessary to mount both an engine and an electric power train on a vehicle, and a spark ignition engine having a relatively small displacement is often used from the viewpoint of mounting space and weight. In such a small displacement engine, the engine is operated at a relatively high rotation speed in order to obtain a necessary power generation amount, and it is a problem to reduce noise (hereinafter, "engine noise") associated therewith.

In order to reduce the engine noise, it is effective to reduce the rotation speed of the engine as much as possible.

However, in order to obtain the same power generation output at a low rotation speed as in the case of a high rotation speed, the engine torque becomes high, and the time required for flame propagation becomes long, so that knocking is likely to occur. Therefore, in order to reduce the engine noise, it is required to reduce the engine rotation speed while suppressing knocking within an allowable limit.

In the hybrid system described in PTL 1, a technique for controlling the engine and the generator at the time of occurrence of knocking to reduce knocking is disclosed, but a technique for reducing the engine rotation speed while suppressing knocking within an allowable limit for the purpose of reducing noise is not disclosed.

The invention has been made in view of the above circumstances, and an object of the invention is to provide a hybrid vehicle control device excellent in quietness while suppressing knocking within an allowable limit.

Solution to Problem

In order to solve the above problems, a hybrid vehicle control device of an aspect of the invention is a hybrid vehicle control device that controls a hybrid vehicle including a motor that drives wheels, a generator that supplies electric power to a motor, and an engine configured by an internal combustion engine that drives a generator, and includes a control unit that calculates a knock index value indicating a knock degree of the engine at an engine operating point represented by a relationship between an engine rotational speed and engine torque, and controls the engine rotational speed and the engine torque based on the knock index value. The control unit sets the target engine rotation speed to be low and the target engine torque to be high in the target power generation amount as the knock index value decreases within a range in which the knock index value does not exceed the knock allowable limit value.

The hybrid vehicle control device of another aspect of the invention is a hybrid vehicle control device that controls a hybrid vehicle including a motor that drives wheels, a generator that supplies electric power to the motor, and an engine configured by an internal combustion engine that drives the generator, and includes a control unit that calculates a knock index value indicating a knock degree of the engine at an engine operating point represented by a relationship between an engine rotational speed and engine torque, and controls the engine rotational speed and the engine torque based on the knock index value. The control unit sets the target engine rotation speed and the target engine torque in the target power generation amount according to the magnitude of the background sound generated from other than the engine or the magnitude of the physical quantity correlated with the background sound within a range in which the knock index value does not exceed the knock allowable limit value.

The hybrid vehicle control device of still another aspect of the invention is a hybrid vehicle control device that controls a hybrid vehicle including a motor that drives wheels, a generator that supplies electric power to the motor, and an engine configured by an internal combustion engine that drives the generator, and includes a control unit that calculates a knock index value indicating a knock degree of the engine at an engine operating point represented by a relationship between an engine rotational speed and engine torque, and controls the engine rotational speed and the engine torque based on the knock index value. The control unit sets the target engine rotation speed and the target engine torque in the target power generation amount according to the selected operation mode within a range in which the knock index value does not exceed the knock allowable limit value.

Advantageous Effects of Invention

According to at least one aspect of the invention, it is possible to provide a hybrid vehicle control device excellent in quietness by reducing the engine rotation speed while suppressing knocking within an allowable limit.

Objects, configurations, and effects besides the above description will be apparent through the explanation on the following embodiments.

DESCRIPTION OF EMBODIMENTS

Figure 1:
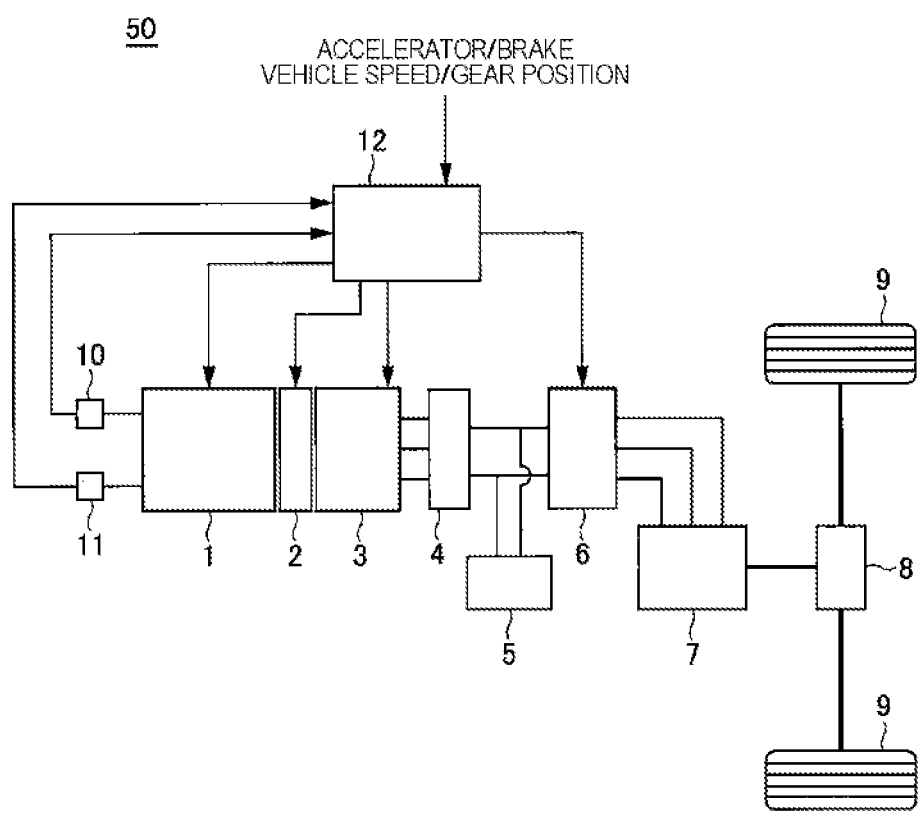
FIG. 1 is an explanatory diagram illustrating an example of a system configuration of a hybrid vehicle according to a first embodiment of the invention.

Hereinafter, examples of modes for carrying out the invention (hereinafter, it is described as "embodiment") will be described with reference to the accompanying drawings. In the present specification and the accompanying drawings, components having substantially the same function or configuration are denoted by the same reference numerals, and the redundant description is omitted.

<1. First Embodiment> [System Configuration of Hybrid Vehicle]

First, an example of a system configuration of a hybrid vehicle to which the invention is applied will be described.

FIG. 1 illustrates an example of a system configuration of a hybrid vehicle according to a first embodiment of the invention. In each of the following embodiments, the system configuration of the hybrid vehicle illustrated in FIG. 1 will be described as an example.

In the hybrid vehicle illustrated in FIG. 1, an engine 1, a speed increasing gear 2, and an induction generator 3 are connected in series. The shaft output of the engine 1 is accelerated to a rotation speed suitable for the induction generator 3 by the speed increasing gear 2 to drive the induction generator 3. In addition, the speed increasing gear 2 is configured as a variable gear system, and the speed increasing ratio thereof can be changed. The three-phase AC power generated by the induction generator 3 is converted into DC power by a rectifier 4 and then supplied to an inverter 6 and a battery 5. The DC power is converted into three-phase AC power again by the inverter 6 and then supplied to an induction motor 7. The induction motor 7 drives the left and right wheels 9 via a transaxle 8.

A controller 12 is an example of a hybrid vehicle control device that controls each component of a hybrid vehicle 50 and executes various data processing. For example, the controller 12 obtains a motor output necessary for driving the vehicle from information such as an accelerator, a brake, a vehicle speed, and a gear position, and controls the inverter 6 to supply a predetermined amount of power to the induction motor 7. In addition, the controller 12 controls the output of the engine 1, the speed increasing ratio of the speed increasing gear 2, and the field current of the induction generator 3, and manages the entire power system of the vehicle. An electronic control unit (ECU) is used as the controller 12 as an example.

[Engine]

Figure 2:
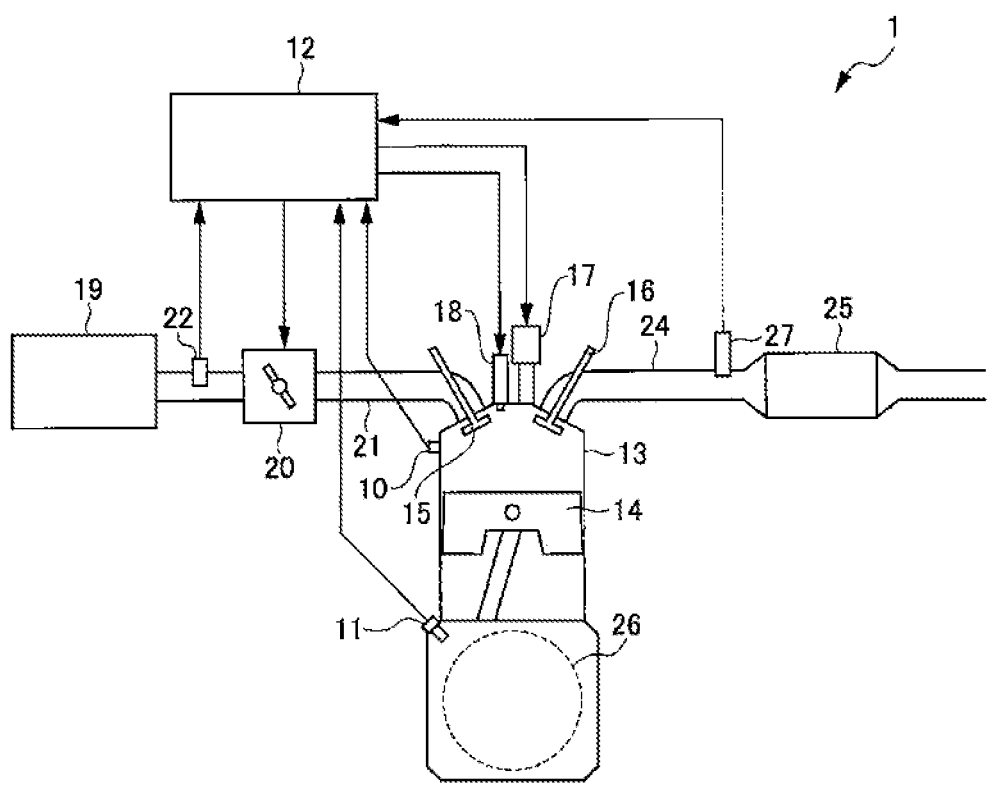
FIG. 2 is an explanatory diagram illustrating an example of a cross section of an engine according to the first embodiment of the invention.

FIG. 2 illustrates an example of a cross section of the engine 1. The engine 1 is an example of a spark ignition 4-cycle gasoline engine, and a combustion chamber is formed by an engine head, a cylinder 13, a piston 14, an intake valve 15, and an exhaust valve 16. In the engine 1, a fuel injection valve 18 is provided in the engine head, and an injection nozzle of the fuel injection valve 18 penetrates into the combustion chamber, so that a so-called in-cylinder direct injection type internal combustion engine is configured. An ignition plug 17 is also provided in the engine head. Combustion air is taken into the combustion chamber through an air cleaner 19, a throttle valve 20, and an intake port 21. The burnt gas (exhaust gas) discharged from the combustion chamber is discharged to the atmosphere through an exhaust port 24 and a catalytic converter 25.

The amount of air taken into the combustion chamber is measured by an air flow sensor 22 provided on the upstream side of the throttle valve 20. The air-fuel ratio of the gas (exhaust) discharged from the combustion chamber is detected by an air-fuel ratio sensor 27 provided on the upstream side of the catalytic converter 25. A knock sensor 10 is provided in a cylinder block (not illustrated) having a structure in which the cylinder 13 and a crankcase are integrated. The knock sensor 10 outputs a detection signal corresponding to a knock state quantity in the combustion chamber.

Furthermore, a timing rotor 26 (signal rotor) is provided in a shaft portion of the crankshaft. The crank angle sensor 11 disposed on the timing rotor 26 detects a signal of the timing rotor 26 to detect the rotation and the phase of the crankshaft, that is, the engine rotation speed. The detection signals of the knock sensor 10 and the crank angle sensor 11 are taken into the controller 12 and used for state detection and operation control of the engine 1 in the controller 12.

The controller 12 outputs the opening degree of the throttle valve 20 (hereinafter, referred to as a "throttle opening degree"), the timing of starting and ending fuel injection by the fuel injection valve 18, the ignition timing by the ignition plug 17, and the like, and controls the engine 1 to be in a predetermined operation state.

The invention is particularly suitable for application to an engine such as a spark ignition engine in which knocking may occur, and it is possible to provide a hybrid vehicle excellent in quietness while suppressing knocking within an allowable limit. Although only a single cylinder is illustrated in FIG. 2 to illustrate the configuration of the combustion chamber of the engine 1, the engine 1 according to the embodiment of the invention may be a multi-cylinder engine including a plurality of cylinders.

[Controller]

Figure 3:
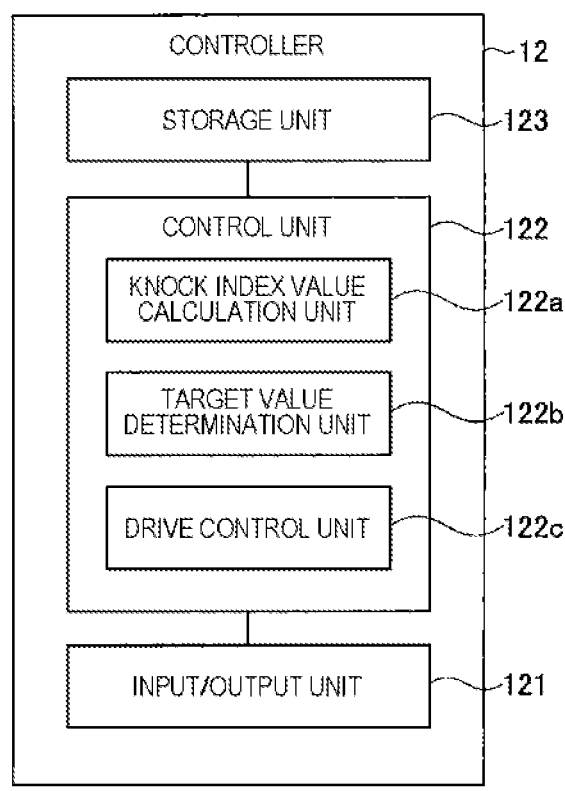
FIG. 3 is a block diagram illustrating a configuration example of a controller according to the first embodiment of the invention.

FIG. 3 is a block diagram illustrating a configuration example of the controller 12. The controller 12 includes an input/output unit 121, a control unit 122, and a storage unit 123 electrically connected to each other via a system bus (not illustrated).

The input/output unit 121 includes an input port and an output port (not illustrated), and performs input and output processing on each device and each sensor in the vehicle. For example, the input/output unit 121 performs signal processing such as noise removal on the input signal and transmits the signal to the control unit 122. In addition, the input/output unit 121 outputs a control signal to each device according to a command of the control unit 122.

The control unit 122 controls a power system and an electrical system of the vehicle. For example, the control unit 122 controls an engine operating point according to a knocking state of the engine 1 including an internal combustion engine. The control unit 122 includes a knock index value calculation unit 122*a*, a target value determination unit 122*b*, and a drive control unit 122*c*.

The knock index value calculation unit 122*a* periodically calculates a knock index value indicating a knock degree at an engine operating point of the engine 1, and outputs the calculated knock index value to the target value determination unit 122*b*. The engine operating point is expressed by a relationship between the engine rotation speed and the engine torque as described later (see FIG. 13).

The target value determination unit 122*b* determines a target engine rotation speed and target engine torque of the engine 1 in the target power generation amount of the induction generator 3 based on the current knock index value calculated by the knock index value calculation unit 122*a*.

The drive control unit 122*c* controls the drive of the engine 1 and/or the induction generator 3 based on the target engine rotation speed and the target engine torque determined by the target value determination unit 122*b*.

The storage unit 123 is a volatile memory such as a random access memory (RAM) or a nonvolatile memory such as a read only memory (ROM). In the storage unit 123, a control program executed by an arithmetic processing device (not illustrated) included in the controller 12 is recorded. The arithmetic processing device reads the control program from the storage unit 123 and executes the control program, whereby the function of each block of the control unit 122 is realized. For example, a central processing unit (CPU) or a micro processing unit (MPU) can be used as the arithmetic processing device. Note that the controller 12 may include a non-volatile auxiliary storage device including a semiconductor memory or the like, and the control program may be stored in the auxiliary storage device.

The invention is suitably applied to engine operating point control of a hybrid vehicle of a type in which an engine is dedicated to power generation. However, it is a matter of course that the invention can be applied to a hybrid vehicle in which the engine is not dedicated to power generation.

[Throttle Opening and Filling Rate]

Figure 4:
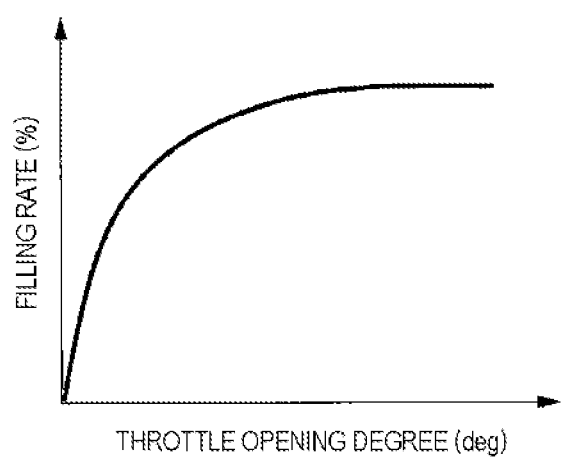
FIG. 4 is a characteristic diagram illustrating an example of a relationship between a throttle opening and a filling rate sucked into a combustion chamber.

FIG. 4 is a characteristic diagram illustrating an example of a relationship between a throttle opening and a filling rate of air taken into the combustion chamber. In FIG. 4, the horizontal axis represents the throttle opening degree (deg), and the vertical axis represents the filling rate (%). Since the throttle opening and the filling rate are uniquely determined as illustrated in FIG. 4, the throttle opening to be set can be obtained from a target filling rate by obtaining the relationship between the throttle opening and the filling rate in advance by calibration (pre-measurement) or the like.

[Throttle Opening and Engine Torque]

Figure 5:
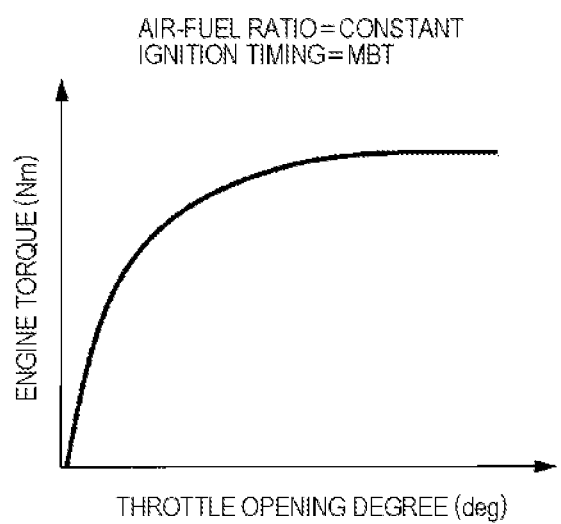
FIG. 5 is a characteristic diagram illustrating an example of a relationship between a throttle opening and engine torque.

FIG. 5 is a characteristic diagram illustrating an example of a relationship between the throttle opening and the engine torque. In FIG. 5, the horizontal axis represents the throttle opening degree (deg), and the vertical axis represents the engine torque (Nm). In the example of FIG. 5, the air-fuel ratio is constant, and the ignition timing is the optimum ignition timing (Minimum advance for the Best Torque: MBT). In the engine 1 of the present embodiment, the fuel injection amount per cycle from the fuel injection valve 18 is determined by feedback control so that the air-fuel ratio of the exhaust gas detected by the air-fuel ratio sensor 27 becomes the theoretical air-fuel ratio. Therefore, as illustrated in FIG. 5, the engine torque is uniquely determined by the throttle opening.

[Detection Result of Knock Sensor]

Figure 6:
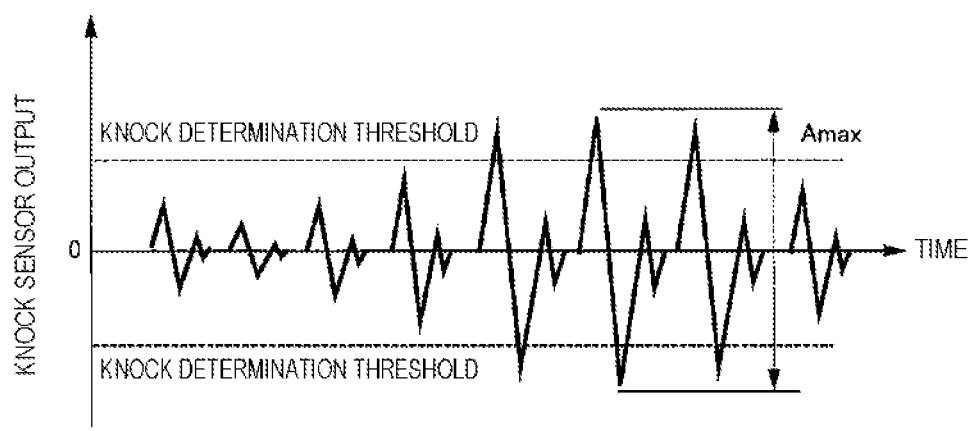
FIG. 6 is an explanatory diagram illustrating an example of a detection result by a knock sensor.

FIG. 6 shows an example of a detection result by the knock sensor 10. In FIG. 6, the horizontal axis represents time, and the vertical axis represents a knock sensor output value. The knock sensor 10 is an acoustic sensor (microphone) that detects a vibration sound of an engine block. Vibration generated by knocking is detected by the knock sensor 10, and a time history thereof is taken into the controller 12. In the controller 12, the control unit 122 (knock index value calculation unit 122a) compares the amplitude of vibration with a predetermined knock determination threshold, and determines that knock has occurred when the amplitude is larger than the knock determination threshold.

In general, there is an allowable limit to the frequency and strength of knocking, and when this allowable limit is exceeded, the engine may be damaged or the comfort of the vehicle may be impaired by the knocking sound. It is therefore necessary to determine the engine operating point such that the knock is below the allowable limit. For this purpose, it is desirable to apply an index value capable of quantitatively indicating the knock degree to engine control.

Therefore, in each embodiment of the invention, the number of times of occurrence of knock within a predetermined time is counted and used as a knock index value. Alternatively, the maximum amplitude Amax of vibration within a predetermined period or the average amplitude of vibration within a predetermined period is set as the knock index value. That is, the knock index value is a value indicating a knock degree defined by a knock occurrence frequency or knock strength.

[Knock Index Value and Knock Degree]

Figure 7:
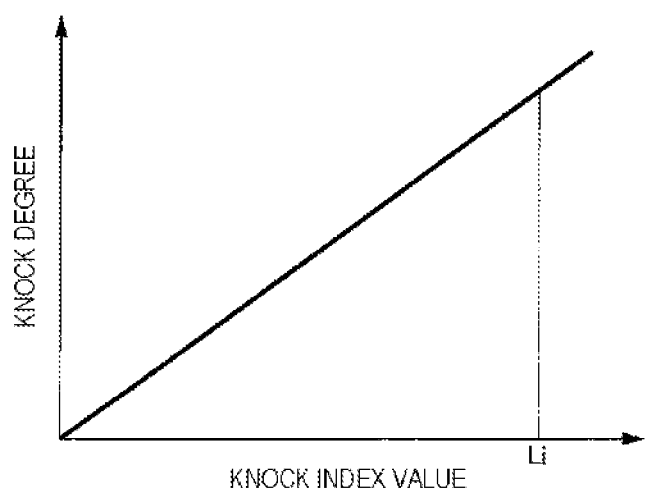
FIG. 7 is a characteristic diagram showing an example of a relationship between a knock index value and a knock degree.

FIG. 7 is a characteristic diagram showing an example of a relationship between a knock index value and a knock degree. In FIG. 7, the horizontal axis represents the knock index value, and the vertical axis represents the knock degree, and the higher the knock degree, the larger the knock index value. The engine operating point of the engine 1 is controlled so that the knock index value does not exceed a knock allowable limit value Li.

The knock index value can be determined by various methods other than the above method. For example, the engine 1 may be provided with an in-cylinder pressure sensor (not illustrated), and the knock index value may be obtained by detecting the frequency of knocking and the strength of knocking from the vibration of the in-cylinder pressure during combustion. Furthermore, the frequency and strength of knocking may be estimated by a mathematical model created from the filling rate, the rotational speed, the air temperature, and the like, or may be estimated with reference to a map created by calibration or the like.

[Induction Motor]

Figure 8:
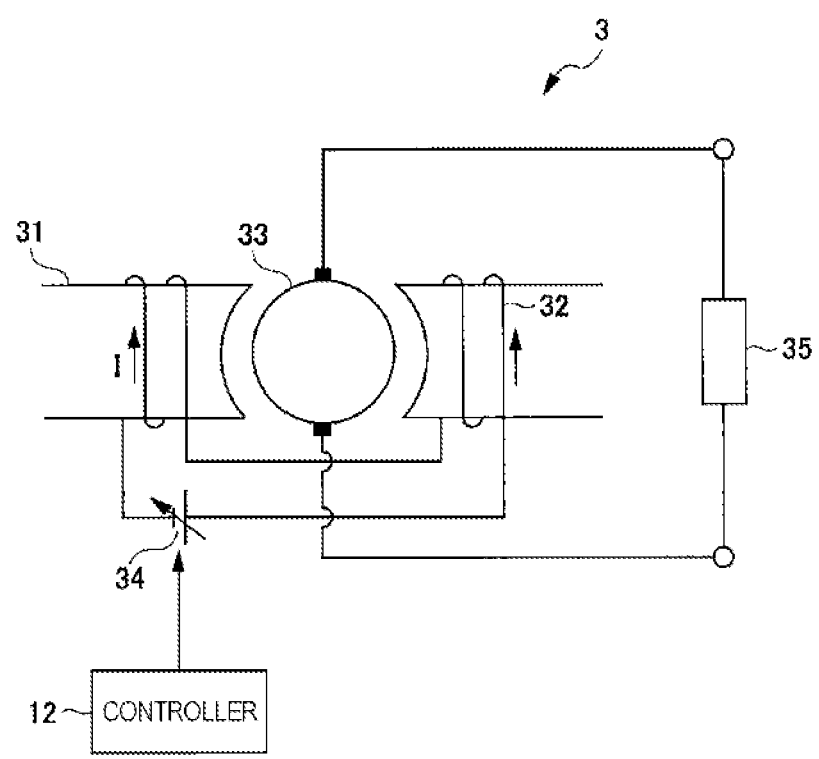
FIG. 8 is an explanatory diagram illustrating an example of a cross section of an induction generator.

FIG. 8 shows an example of a cross section of the induction generator 3. The induction generator 3 generates AC power by rotating a rotor 33 connected to a power load 35 in a magnetic field generated by a coil 32 wound around a stator 31. The induction generator 3 can adjust the power generation amount by the magnitude of the field current I flowing through the coil 32 of the stator 31 and the rotational speed of the rotor 33.

The drive control unit 122c of the controller 12 controls the voltage of a variable power source 34 to control the magnitude of the field current I. For example, when the rotation speed of the rotor 33 is constant, the larger the field current I, the larger the power generation amount. When the field current I is constant, the higher the rotation speed of the rotor 33, the larger the power generation amount. The load torque (hereinafter referred to as "power generation load torque") of the induction generator 3 as viewed from the engine 1 varies depending on the magnitude of the field current I.

[Field Current and Power Generation Load Torque]

Figure 9:
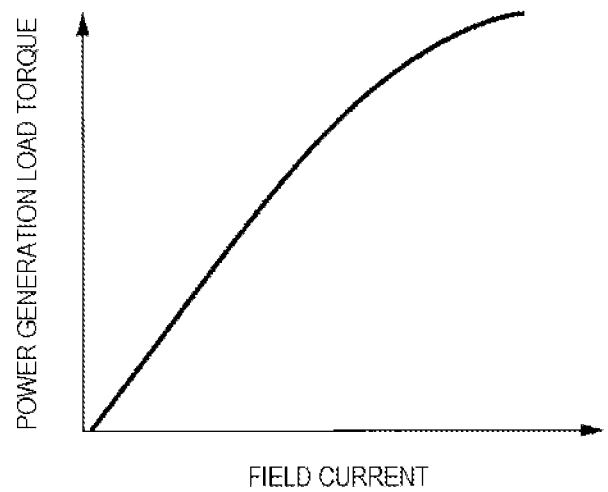
FIG. 9 is a characteristic diagram illustrating an example of a relationship between a field current and power generation load torque.

FIG. 9 is a characteristic diagram illustrating an example of a relationship between a field current and power generation load torque. In FIG. 9, the horizontal axis represents the field current, and the vertical axis represents the power generation load torque. As illustrated in FIG. 9, the larger the field current, the higher the power generation load torque. Therefore, in the induction generator 3, the power generation load torque and the power generation amount can be controlled by adjusting the magnitude of the field current by the controller 12.

The generator used in the hybrid vehicle 50 is not limited to the induction generator 3 shown in the present embodiment. For example, a permanent magnet synchronous generator may be used. In the case of the permanent magnet synchronous generator, the power generation load torque and the power generation amount are controlled by current control of the inverter instead of the field current.

In addition, the same control as the field current described above can be performed by the speed increasing ratio of the speed increasing gear 2. When the engine rotation speed is constant, the rotation speed of the induction generator 3 increases and the power generation amount increases as the speed increasing ratio of the speed increasing gear 2 increases.

[Speed Increasing Ratio and Power Generation Load Torque]

Figure 10:
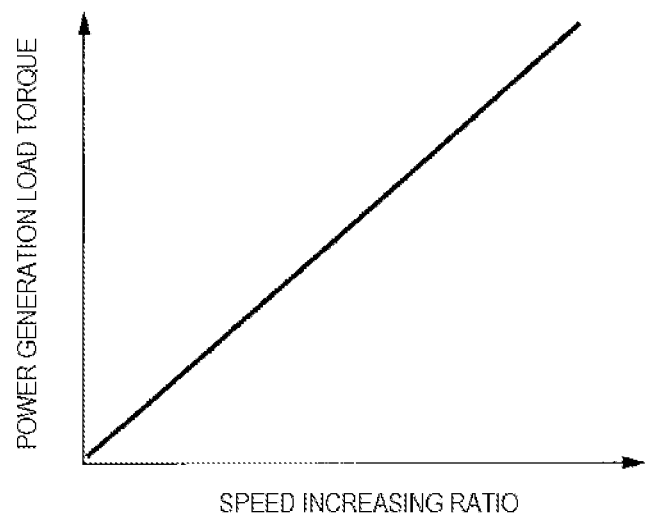
FIG. 10 is a characteristic diagram illustrating an example of a relationship between a speed increasing ratio of a speed increasing gear and power generation load torque in a case where a field current is constant.

FIG. 10 is a characteristic diagram illustrating an example of a relationship between the speed increasing ratio of the speed increasing gear 2 and the power generation load torque in a case where the field current is constant. In FIG. 10, the horizontal axis represents the speed increasing ratio, and the vertical axis represents the power generation load torque. As illustrated in FIG. 10, when the field current is constant, the power generation load torque increases as the speed increasing ratio increases. That is, the load seems to increase from the viewpoint of the engine 1. Therefore, the power generation load torque and the power generation amount can be controlled by adjusting the speed increasing ratio of the speed increasing gear 2 by the controller 12.

[Engine Rotation Speed and Engine Torque]

Figure 11:
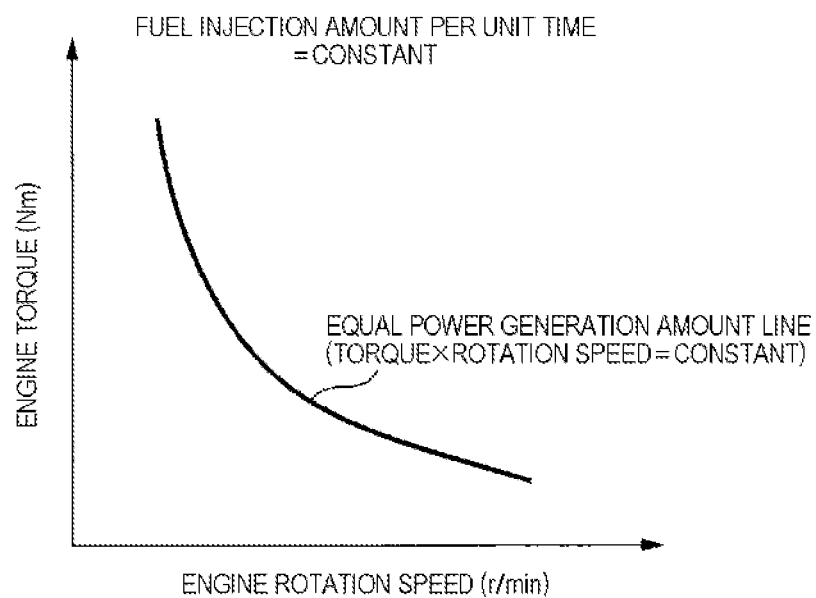
FIG. 11 is a characteristic diagram illustrating an example of a relationship between an engine rotation speed for driving the induction generator and a power generation amount with respect to engine torque.

FIG. 11 is a characteristic diagram illustrating an example of the relationship between the engine rotation speed for driving the induction generator 3 and the power generation amount with respect to the engine torque. In FIG. 11, the horizontal axis represents the engine rotation speed (r/min), and the vertical axis represents the engine torque (Nm). In FIG. 11, the fuel injection amount per unit time is constant.

Since the power generation amount is proportional to the product of the engine torque and the engine rotation speed, the product of the engine torque and the engine rotation speed is constant along the equal power generation amount line illustrated in FIG. 11, that is, the power generation amount is constant. Therefore, a constant power generation amount can be obtained at various engine operating points by changing the engine rotation speed and the engine torque along the equal power generation amount line.

[Method for Changing Engine Operating Point]

Next, assuming a case where the power generation amount by the induction generator 3 is changed in the hybrid vehicle 50, a method for changing the engine operating point according to the present embodiment will be described.

Figure 12:
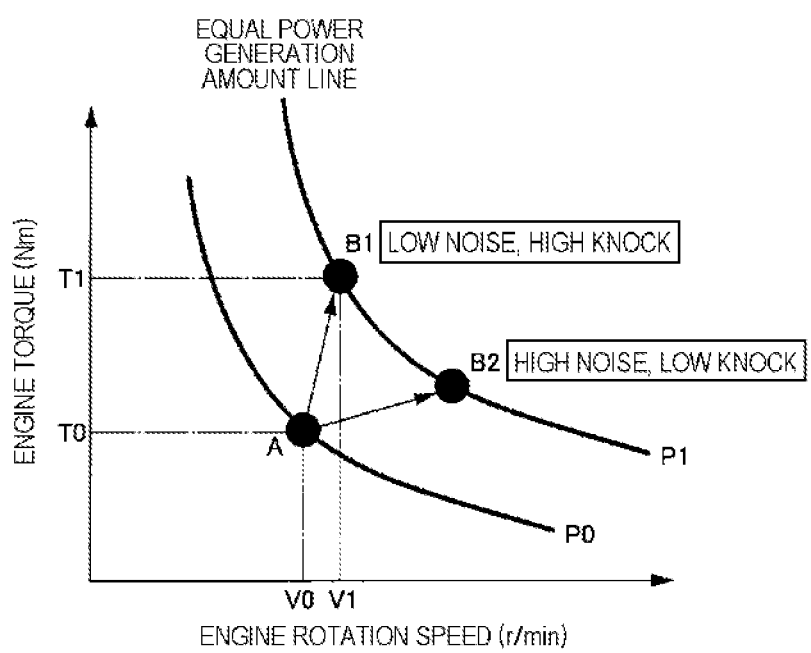
FIG. 12 is an explanatory diagram illustrating an example of transition of an engine operating point according to a transient state in which the power generation amount increases.

FIG. 12 illustrates an example of transition of the engine operating point in a transient state in which the power generation amount increases from "P0" to "P1". In FIG. 12, the horizontal axis represents the engine rotation speed (r/min), the vertical axis represents the engine torque (Nm), and the engine operating point A represents the current engine operating point at the power generation amount P0. In the case of shifting from the engine operating point A of the power generation amount P0 to the power generation amount P1, an arbitrary engine operating point on the equal power generation amount line of the power generation amount P1 can be selected. An engine operating point B1 and an engine operating point B2 are illustrated in FIG. 12 as representative points. As an example, the engine rotation speed and the engine torque at the engine operating point A are indicated as (V0, T0), and the engine rotation speed and the engine torque at the engine operating point B1 are indicated as (V1, T1).

Comparing the engine operating point B1 and the engine operating point B2, the engine operating point B1 has a low engine rotation speed and high engine torque. Since the engine rotation speed is low at the engine operating point B1, the engine noise is relatively small. At the engine operating point B1, the engine rotation speed is low and the engine torque is large, so that the knock degree increases. On the other hand, at the engine operating point B2, the engine rotation speed is high and the engine torque is low. Therefore, at the engine operating point B2, the engine noise is relatively high, and the knock degree is low. Thus, the two engine operating points B1 and B2 are in a trade-off relationship with respect to noise and knock.

From the viewpoint of noise reduction, it is desirable to select an engine operating point at which the engine rotation speed is as low as possible on the equal power generation amount line of the power generation amount P1. However, how much the engine rotation speed can be lowered depends on the knock degree at the engine operating point A. As described above, in order to obtain the same power generation output at a low rotation speed as in the case of a high rotation speed, the engine torque becomes high, and the time required for flame propagation becomes long, so that knocking is likely to occur.

[How to Determine Target Rotation Speed and Target Engine Torque]

Figure 13:
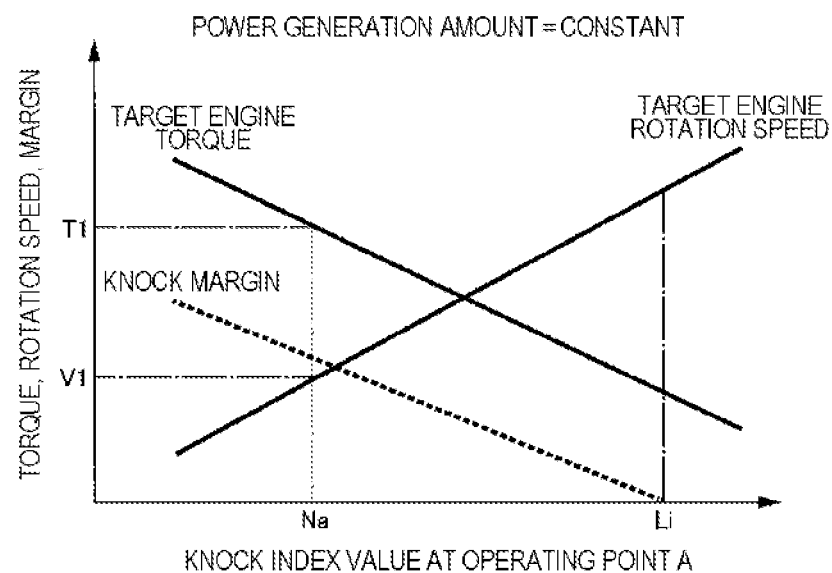
FIG. 13 is an explanatory diagram illustrating an example of how to determine a target engine rotation speed and target engine torque according to the first embodiment of the invention.

FIG. 13 illustrates an example of how to determine the target engine rotation speed and the target engine torque according to the first embodiment. In FIG. 13, the horizontal axis represents the knock index value, and the vertical axis represents torque/rotational speed/margin.

As illustrated in FIG. 13, in the present embodiment, the control unit 122 determines the target engine rotation speed "V1" and the target engine torque "T1" at the engine operating point of the power generation amount P1 after the switching according to the knock index value "Na" at the engine operating point A of the power generation amount P0 before the switching. More specifically, when the knock index value at the engine operating point A is low, the target engine rotation speed is set lower and the target engine torque is set higher than when the knock index value at the engine operating point A is high. At this time, the combination of the target engine rotation speed and the target engine torque is determined such that the product of the target engine rotation speed and the target engine torque is constant, that is, the power generation amount is constant (=P1). For example, in FIG. 13, the characteristic of the target engine rotation speed with respect to the knock index value is represented by a straight line with a positive inclination, and the characteristic of the target engine torque with respect to the knock index value is represented by a straight line with a negative inclination.

By determining the target engine rotation speed and the target engine torque in this manner, the following effects can be obtained. When the knock degree at the engine operating point A is low, it is estimated that the tolerance (margin and degree of margin to the knock allowable limit value Li) against knocking is large in the power generation amount P1 after switching. Therefore, by setting the engine rotation speed as low as possible, the engine noise after changing the engine operating point can be suppressed. On the other hand, when the knock degree at the engine operating point A is high, it is estimated that the margin against knocking is small in the power generation amount P1 after changing. Therefore, by setting the engine rotation speed high, it is possible to prevent the knock index value at the engine operating point after changing from exceeding the knock allowable limit value Li.

Incidentally, the likelihood and strength of knocking change depending on the conditions of deposits (so-called deposits) in the combustion chamber, temporal changes of the engine such as air temperature, cooling water temperature, humidity, and fuel properties, and environmental conditions. For example, in a case where the deposit in the combustion chamber is large, in a case where the octane number of the fuel is low, and in a case where the temperature is high, or the humidity is low, knocking is likely to occur, or the strength of knocking is increased.

Therefore, the engine operating point is generally set with a predetermined margin so that knocking does not exceed an allowable limit due to a temporal change of the engine or a change in environmental conditions. More specifically, in consideration of a temporal change and an environmental change of the engine, for example, the engine operating point is often set to an engine operating point at a high rotation speed and low torque with respect to an engine operating point at which the knock index value is near the knock allowable limit value Li.

On the other hand, in the present embodiment, since the engine operating point after shifting to a different power generation amount is determined according to the knock degree at the engine operating point A, the temporal change of the engine and the influence of environmental conditions are reflected in the engine operating point after shifting. In the present embodiment, characteristics indicating the relationship between the knock index value, the engine rotation speed, and the engine torque as illustrated in FIG. 13 are stored in the storage unit 123 for each power generation amount.

[Transition of Engine Operating Point]

Next, an example of transition of the engine operating point in a case where the power generation amount is switched will be described.

Figure 14:
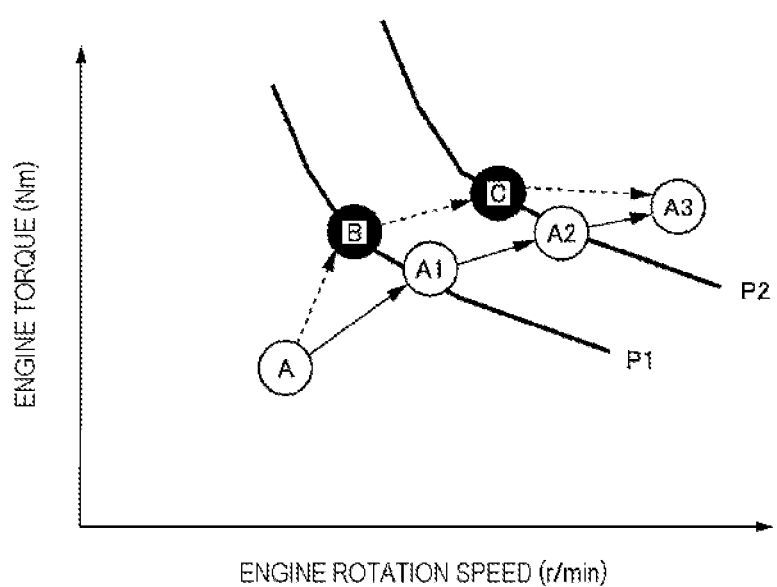
FIG. 14 is an explanatory diagram illustrating an example of transition of an engine operating point when the power generation amount is increased at the time of acceleration according to the first embodiment of the invention.

FIG. 14 illustrates an example of transition of the engine operating point in a case where the power generation amount is increased at the time of acceleration according to the first embodiment. In FIG. 14, the horizontal axis represents the engine rotation speed (r/min), and the vertical axis represents the engine torque (Nm). In FIG. 14, white circle symbols are examples of the transition of the engine operating point according to the prior art (A→A1→A2→A3), and black circle symbols are examples of the transition of the engine operating point according to the present embodiment (A→B→C→A3). Along with the acceleration, the engine operating point A in a charging mode shifts to the engine operating points A1, A2, and A3 or the engine operating points B, C, and A3 in a high speed mode.

As described above, the default setting information (FIG. 14) in which the transition from the engine operating point (A) at a first target power generation amount to the engine operating point (A1, A2) at the second target power generation amount (P1, P2) is set is previously stored in the storage unit (the storage unit 123) of the present embodiment.

Then, when changing the engine operating point between the first target power generation amount and the second target power generation amount (P1, P2), the control unit (control unit 122) is configured to determine the engine rotation speed of the engine operating point (B, C) after changing to be a high value and determine the engine torque to be a small value as compared with the case of the engine operating point (A1, A2) at the second target power generation amount (P1, P2) set in the default setting information.

As described above, in the present embodiment, when the engine operating point is changed in accordance with the switching of the power generation amount, the engine operating point is determined such that the engine operating point becomes lower in rotation speed and higher in torque than the engine operating point set by default within the range of the allowable limit of knocking. As a result, the engine noise is reduced as compared with the conventional case.

[Procedure of Processing by Controller]

Figure 15:
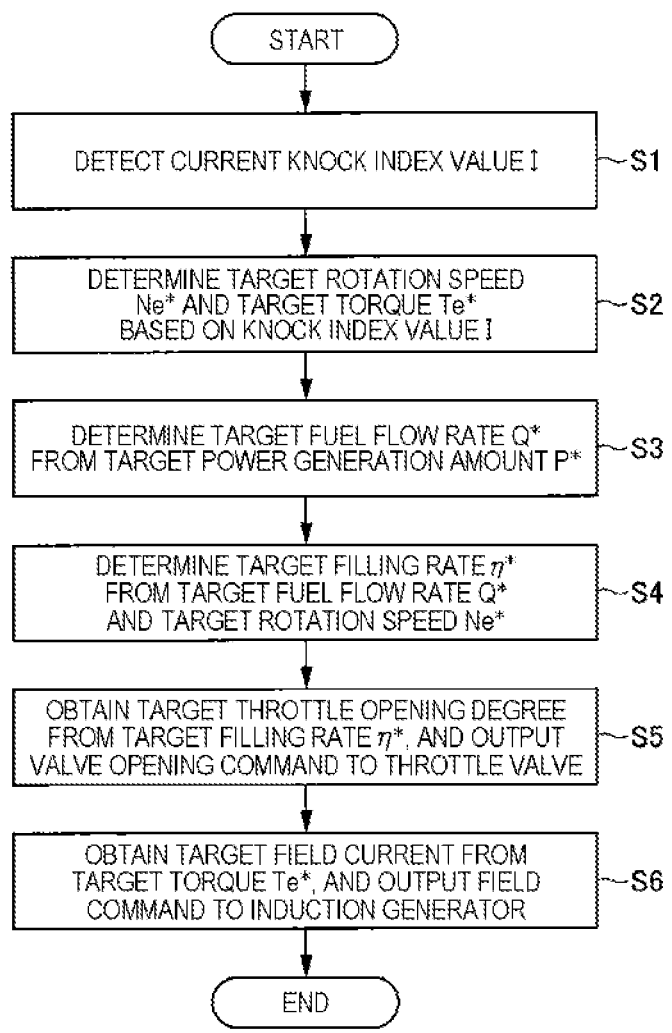
FIG. 15 is an explanatory diagram illustrating a procedure example of processing by a controller according to the first embodiment of the invention.

FIG. 15 illustrates a procedure example of processing by the controller 12. FIG. 15 illustrates a control process of the engine 1 and the induction generator 3 performed by the controller 12 when the power generation amount is changed.

At the time of switching the power generation amount, first, the knock index value calculation unit 122a of the control unit 122 obtains the knock index value I at the current engine operating point based on the detection value of the knock sensor 10 and the like (S1).

Next, the target value determination unit 122b obtains a target engine rotation speed Ne* and target engine torque Te* from the correlation characteristics of the knock index value, the engine rotation speed, and the engine torque illustrated in FIG. 13 based on the knock index value I (S2).

Next, the target value determination unit 122b obtains a target fuel flow rate Q* from a target power generation amount P* after the power generation amount switching (S3). Since the power generation amount and the fuel flow rate have a proportional relationship and are expressed by P=K1×Q, the target fuel flow rate Q* can be calculated from Q*=P*/K1 by setting a proportional constant K1 in advance.

Thereafter, the target value determination unit 122b obtains a target filling rate η* based on the target fuel flow rate Q* and the target engine rotation speed Ne* (S4). The target filling rate can be calculated from η*=K2×AF×Q*/(Ne*×Vc). Here, K2 is a proportional constant, AF is an air-fuel ratio, and Vc is an engine displacement.

Next, the target value determination unit 122b obtains a target throttle opening corresponding to the target filling rate η* from the correlation characteristic between the throttle opening and the filling rate illustrated in FIG. 4. Then, the drive control unit 122c outputs a valve opening command to the throttle valve 20 so as to achieve the target throttle opening (S5).

Further, the target value determination unit 122b obtains a target field current corresponding to the target engine torque Te* from the correlation characteristic between the field current and the power generation load torque illustrated in FIG. 9. Then, the drive control unit 122c outputs a field command to the induction generator 3 so as to achieve a target field current (S6).

The control unit 122 executes processing of each step of the flowchart illustrated in FIG. 15 periodically or at designated timing.

In Step S6, the speed increasing ratio of the speed increasing gear 2 may be variably controlled instead of the field current. In this case, the target value determination unit 122b obtains a target speed increasing ratio corresponding to the target engine torque Te* from the correlation characteristic between the speed increasing ratio and the power generation load torque illustrated in FIG. 10. Then, the drive control unit 122c outputs a shift command to the speed increasing gear 2 so as to achieve the target speed increasing ratio.

Although the example in which the engine rotation speed and the engine torque are determined using the feedforward control has been described here, they may be determined by the feedback control. When the feedback control is used, the control target value is repeatedly controlled such that the difference between the detection result such as the engine rotation speed and the air flow rate and the control target value becomes small, so that the engine operating point can be set with higher accuracy.

As described above, the hybrid vehicle control device (controller 12) according to the first embodiment is a hybrid vehicle control device that controls a hybrid vehicle (hybrid vehicle 50) including a motor (induction motor 7) that drives wheels, a generator (induction generator 3) that supplies electric power to the motor, and an engine (engine 1) configured by an internal combustion engine that drives the generator, and includes a control unit (control unit 122) that calculates a knock index value indicating a knock degree of the engine at an engine operating point (A) represented by a relationship between an engine rotational speed and engine torque, and controls the engine rotational speed and the engine torque based on the knock index value. The control unit is configured to set the target engine rotation speed to be lower and the target engine torque to be higher in the target power generation amount (P1) as the knock index value decreases.

According to the first embodiment described above, the knock index value at the current engine operating point is acquired, and the target engine rotation speed in the target power generation amount is set to be low and the target engine torque is set to be high as the knock index value decreases within a range in which the knock index value does not exceed the knock allowable limit value. As a result, it is possible to provide a hybrid vehicle control device excellent in quietness by reducing the engine rotation speed at the target power generation amount while suppressing knocking within the allowable limit.

In addition, the control unit (control unit 122) of the present embodiment is configured to determine the target engine rotation speed and the target engine torque such that a product of the target engine rotation speed and the target engine torque becomes constant according to the target power generation amount (P1) (see FIG. 13). As a result, the engine operating point can be changed while keeping the target power generation amount constant.

In the present embodiment, when the target power generation amount (from P0 to P1) is switched, the knock index value is a value obtained in the engine operating state (engine operating point A) before the target power generation amount is switched. As a result, the engine operating state before the target power generation amount is switched can be reflected in the engine operating point after changing.

In addition, the control unit (control unit 122) of the present embodiment includes a storage unit (storage unit 123) that stores engine characteristics (for example, FIG. 13) in which the target engine rotation speed has a positive correlation with the knock index value and the target engine torque has a negative correlation with the knock index value. The control unit is configured to determine the target engine rotation speed and the target engine torque based on the engine characteristics stored in the storage unit.

As described above, by storing the engine characteristics in the storage unit, the control unit can change the engine operating point in a direction in which the engine noise decreases with reference to the engine characteristics.

2. Second Embodiment

In the first embodiment, the control of the engine 1 and the induction generator 3 for realizing the noise reduction when the power generation amount is changed has been described. On the other hand, even when the power generation amount is constant, noise can be reduced by the engine operating point control based on the knock index value. Hereinafter, the engine operating point control when the power generation amount is constant will be described with reference to the drawings.

Figure 16:
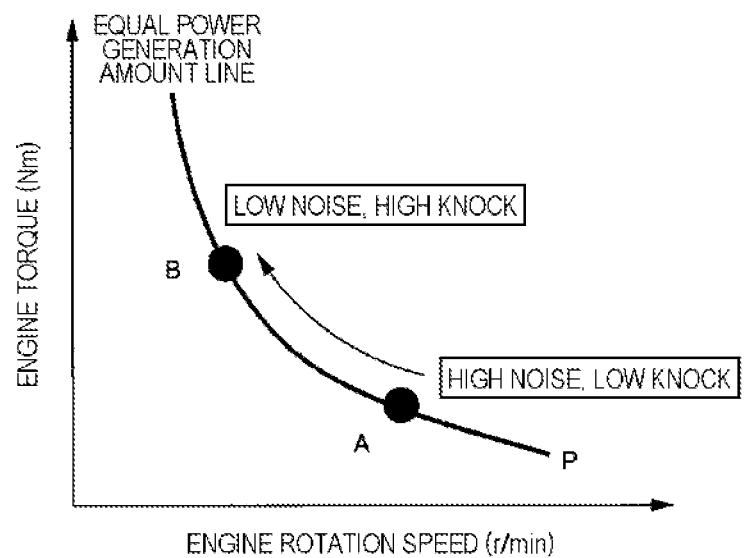
FIG. 16 is an explanatory diagram illustrating an example of an equal power generation amount line on a plane configured by an engine rotation speed and engine torque.

FIG. 16 illustrates an example of an equal power generation amount line on a plane configured by the engine rotation speed and the engine torque. In FIG. 16, the horizontal axis represents the engine rotation speed (r/min), and the vertical axis represents the engine torque (Nm). In FIG. 16, when the current engine operating point A is moved to the engine operating point B on the low rotation speed, degree, and high torque side along the equal power generation amount line of the power generation amount P, the engine noise can be reduced more than the engine operating point A while keeping the power generation amount P constant.

On the other hand, since the engine operating point B has a low engine rotation speed and high engine torque, the knock degree increases as compared with the engine operating point A. Therefore, how much the engine rotation speed at the engine operating point B can be reduced depends on the knock degree at the engine operating point A. Therefore, in the present embodiment, the engine rotation speed and the engine torque at the engine operating point B are determined based on the knock index value at the engine operating point A.

Figure 17:
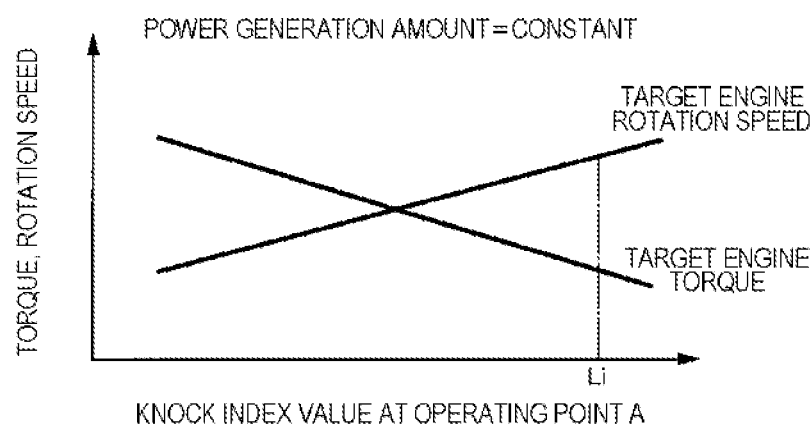
FIG. 17 is an explanatory diagram illustrating an example of how to determine a target engine rotation speed and target engine torque according to a second embodiment of the invention.

FIG. 17 illustrates an example of how to determine the target engine rotation speed and the target engine torque according to the second embodiment. FIG. 17 is similar to the characteristics illustrated in FIG. 13, and the horizontal axis in FIG. 17 represents the knock index value, and the vertical axis represents the torque and the rotational speed.

As illustrated in FIG. 17, in the present embodiment, the target value determination unit 122b determines the target engine rotation speed and the target engine torque at the engine operating point B of the same power generation amount P according to the knock index value at the engine operating point A of the power generation amount P. More specifically, when the knock index value at the engine operating point A is low, the target engine rotation speed is set lower and the target engine torque is set higher than when the knock index value at the engine operating point A is high. At this time, the combination of the target engine rotation speed and the target engine torque is determined such that the product of the target engine rotation speed and the target engine torque is constant, that is, the power generation amount is constant (=P).

When the target engine rotation speed and the target engine torque at the engine operating point B are determined in this manner, the engine noise can be made lower than that at the current engine operating point A while the knock is kept below the allowable limit.

In addition, by periodically performing such engine operating point control, even in a steady operation state where the power generation amount is constant, the engine operating point can be always maintained in an optimum state with respect to various environmental condition changes. As an example, when knock occurs due to an increase in intake air temperature during operation at the engine operating point A, that is, when an allowable limit of knocking is exceeded, the engine operating point is changed to an engine operating point B (low rotation speed, low torque) on an equal power generation amount line.

As described above, the control unit (control unit 122) of the second embodiment is configured to determine the target engine rotation speed and the target engine torque based on the calculated knock index value with reference to the engine characteristics (FIG. 17) when the target power generation amount (P) is the same at the engine operating point (A) before changing and the engine operating point after changing.

According to the second embodiment described above, the engine noise can be reduced while the target power generation amount is kept constant.

3. Third Embodiment

In addition, the knock index value in the course of transition from the engine operating point A to the engine operating point B along the equal power generation amount line may be detected, and the engine rotation speed and the engine torque at the engine operating point B may be determined based on the knock index value. This control method will be described in detail as a third embodiment of the invention.

Figure 18:
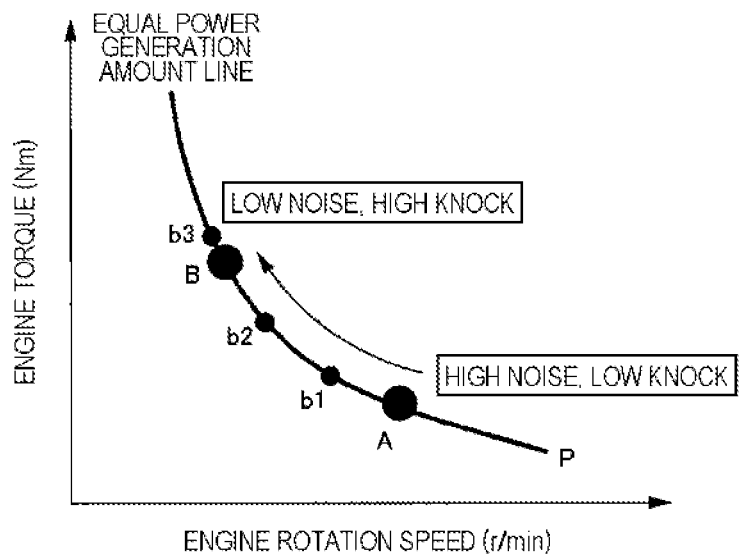
FIG. 18 is an explanatory diagram illustrating an example of detecting a knock index value in the process of transition of an engine operating point on an equal power generation amount line according to a third embodiment of the invention.
Figure 19:
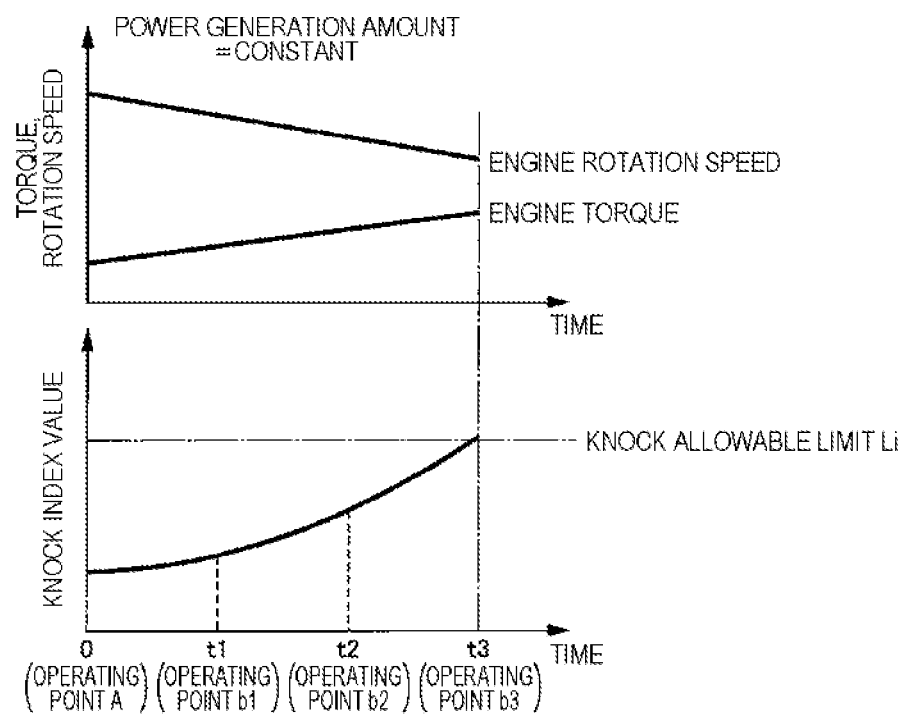
FIG. 19 is an explanatory diagram illustrating an example of transition of a knock index value, an engine rotation speed, and engine torque in the process in which an engine operating point transitions according to a third embodiment of the invention.

FIG. 18 illustrates an example in which the knock index value is detected in the process in which the engine operating point moves from the engine operating point A to the engine operating point B on the equal power generation amount line according to the third embodiment. In FIG. 18, the horizontal axis represents the engine rotation speed (r/min), and the vertical axis represents the engine torque (Nm). FIG. 19 illustrates an example of transition of the knock index value, the engine rotation speed, and the engine torque in the process of transition from the engine operating point A to the engine operating point B according to the third embodiment. In FIG. 19, the horizontal axis represents time, and the vertical axis represents the engine rotation speed/ engine torque (upper side in FIG. 19) and the knock index value (lower side in FIG. 19).

As illustrated in FIG. 18, in the third embodiment, the knock index value calculation unit 122a detects the knock index value in the process while moving the engine operating point along the equal power generation amount line of the electric energy P toward the low rotation speed and the high torque side. In the examples of FIGS. 18 and 19, a time point when departing from the engine operating point A is set as a time 0, and the knock index value is detected at each of the time points t1 to t3 (engine operating points b1 to b3). As illustrated in the upper side and the lower side of FIG. 19, when the knock index value increases with the movement of the engine operating point, the engine rotation speed decreases and the engine torque increases.

Then, the knock index value calculation unit 122a stops the movement of the engine operating point at a time point t3 (engine operating point b3) when the knock index value exceeds the knock allowable limit value Li. Then, the target value determination unit 122b sets the engine operating point before the engine operating point b3 at which the knock allowable limit value Li is exceeded as the engine operating point B (target engine operating point) of the transition destination.

Here, when the knock index value exceeds the knock allowable limit value Li, an engine operating point at which the engine rotation speed is larger than the time point (engine operating point b3) at which the knock index value is determined to exceed by a predetermined value is set as the engine operating point B, but the invention is not limited to this example. For example, the engine operating point b2, which is a sweep point immediately before the sweep point (engine operating point b3) at which the knock index value exceeds the knock allowable limit value Li, may be set as the engine operating point B.

As described above, the control unit (control unit 122) of the third embodiment is configured to perform control to bring the engine operating point (A) close to the engine operating point (B) of the knock allowable limit (Li) by lowering the rotational speed of the engine (engine 1) with reference to the knock index value on one power generation amount line. This control method for the engine operating point can be applied to the first embodiment and the second embodiment.

According to the third embodiment described above, it is determined whether the knock index value has reached the knock allowable limit value while reducing (sweeping) the engine rotation speed at a constant speed, and the engine operating point of the transition destination is determined based on the determination result. With such a configuration, since the engine operating point is determined based on the knocking state at the present time, the engine operating point after transition approaches the allowable limit of knocking, and the engine noise can be minimized.

4. Fourth Embodiment

The allowable limit value for engine noise is not constant and varies depending on environmental conditions For example, when a noise (hereinafter, referred to as "background sound") generated from other than the engine, such as road noise and wind noise of the vehicle, is large, the occupant of the vehicle hardly feels the engine sound, and the allowable limit value for the engine noise is larger than that when the background sound is small. In particular, in the case of a hybrid vehicle of a type in which the engine is dedicated to power generation, the engine is driven regardless of the instruction of the driver or the traveling state, and thus, the engine sound is more noticeable depending on the driver and the occupant than for a general gasoline engine vehicle. Therefore, the engine operating point may be changed according to the magnitude (for example, volume [dB]) of the background sound and the physical quantity correlated with the background sound. This control method will be described in detail as a fourth embodiment of the invention.

Figure 20:
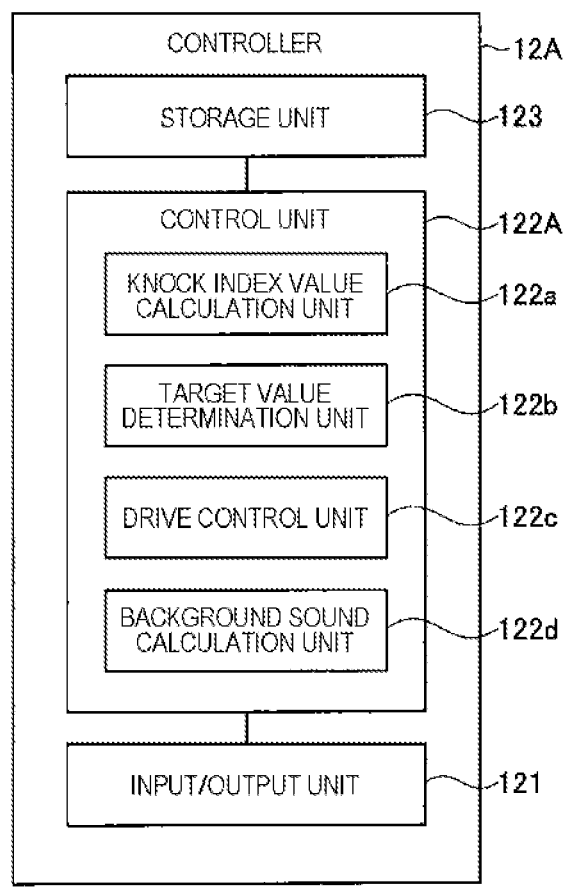
FIG. 20 is a block diagram illustrating a configuration example of a controller according to a fourth embodiment of the invention.

FIG. 20 is a block diagram illustrating a configuration example of a controller according to the fourth embodiment. As illustrated in FIG. 20, a controller 12A of the present embodiment includes an input/output unit 121, a control unit 122A, and a storage unit 123. The control unit 122A includes a background sound calculation unit 122d in contrast to the control unit 122 of the first embodiment (FIG. 3). The control unit 122A will be described mainly focusing on differences from the first embodiment.

The background sound calculation unit 122d calculates the magnitude (volume) of the background sound generated from other than the engine 1 or the magnitude of the physical quantity correlated with the background sound, and outputs the calculation result to the target value determination unit 122b. For example, the background sound calculation unit 122d calculates the magnitude of the background sound from an output signal of an acoustic sensor (not illustrated) disposed in the vehicle. A physical quantity correlated with the background sound will be described later. Hereinafter, the term "background sound" may include a physical quantity correlated with the background sound.

The target value determination unit 122b determines the target engine rotation speed and the target engine torque according to the calculation result received from the background sound calculation unit 122d. Here, the target value determination unit 122b refers to the knock index value of the engine 1 calculated by the knock index value calculation unit 122a, and determines the target engine rotation speed and the target engine torque in the target power generation amount within a range in which the knock index value does not exceed the knock allowable limit value Li (see FIGS. 13 and 17).

Figure 21:
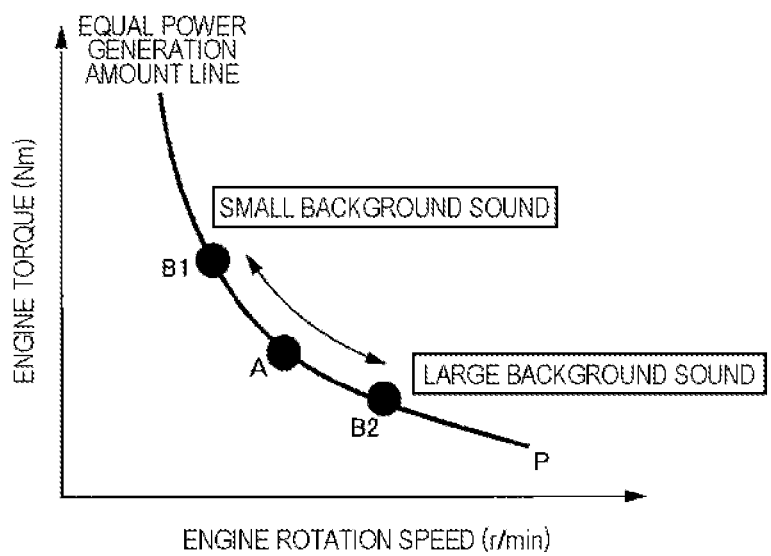
FIG. 21 is an explanatory diagram illustrating an example of changing an engine operating point on an equal power generation amount line according to the magnitude of a background sound according to a fourth embodiment of the invention.

FIG. 21 illustrates an example in which the engine operating point on the equal power generation amount line is changed according to the magnitude of the background sound according to the fourth embodiment. In FIG. 21, the horizontal axis represents the engine rotation speed (r/min), and the vertical axis represents the engine torque (Nm).

In the present embodiment, when the current background sound is small, the current engine operating point A is changed to the engine operating point B1 at which the engine rotation speed is low and the engine torque is high. On the other hand, when the current background sound is large, the current engine operating point A is changed to the engine operating point B2 at which the engine rotation speed is high and the engine torque is low. At this time, the combination of the target engine rotation speed and the target engine torque is determined such that the product of the target engine rotation speed and the target engine torque is constant, that is, the power generation amount is constant (=P).

When the background sound is small, the occupant of the vehicle easily feels the engine sound. However, according to the present embodiment, since the engine rotation speed is set to be low in the target power generation amount, the engine noise can be suppressed to be low. On the other hand, according to the present embodiment, when the background sound is large, the engine rotation speed is set to be high in the target power generation amount, so that the risk of knocking can be reduced. Further, when the background sound is large, it is difficult for the occupant of the vehicle to feel the engine sound. Therefore, even if the engine rotation speed increases, the decrease in comfort due to the engine noise is small.

As described above, the hybrid vehicle control device (controller 12) according to the fourth embodiment is a hybrid vehicle control device that controls a hybrid vehicle (hybrid vehicle 50) including a motor (induction motor 7) that drives wheels, a generator (induction generator 3) that supplies electric power to the motor, and an engine (engine 1) configured by an internal combustion engine that drives the generator, and includes a control unit (control unit 122A) that calculates a knock index value indicating a knock degree of the engine at an engine operating point (A) represented by a relationship between an engine rotational speed and engine torque, and controls the engine rotational speed and the engine torque based on the knock index value. The control unit is configured to set the target engine rotation speed and the target engine torque in the target power generation amount (P) according to the magnitude of the background sound generated from other than the engine or the magnitude of the physical quantity correlated with the background sound within a range in which the knock index value does not exceed the knock allowable limit value (Li).

In addition, the control unit (the control unit 122A) of the present embodiment is configured to set the target engine rotation speed to be low and the target engine torque to be high in the target power generation amount (P) as the background sound or the physical quantity correlated with the background sound decreases.

According to the fourth embodiment described above, the engine operating point is changed according to the magnitude of the background sound generated from other than the engine or the magnitude of the physical quantity correlated with the background sound within a range in which the knock index value of the engine does not exceed the knock allowable limit value. With such a configuration, it is possible to control the engine noise in accordance with the allowable limit value for the engine noise while suppressing knocking within the allowable limit, so that deterioration in comfort due to the engine noise is suppressed.

Modifications

Further, in the present embodiment, when the background sound is small, engine control for reducing knocking may be performed in addition to changing the current engine operating point A to the engine operating point B1 at which the engine rotation speed is low and the engine torque is high. On the other hand, in a case where the background sound is large, engine control for increasing knocking may be performed in addition to changing the current engine operating point A to the engine operating point B2 at which the engine rotation speed is high and the engine torque is low.

Examples of the engine control for increasing or decreasing knocking include ignition timing control. Retarding the ignition timing reduces knocking, and advancing the ignition timing increases knock. Examples of the engine control for increasing or decreasing knocking include compression ratio control. Reducing the compression ratio reduces knocking and increasing the compression ratio increases knocking. In addition, various controls such as control of a cooling water temperature, control of an EGR (Exhaust Gas Recirculation) amount, and control of an oil jet amount of the piston can be considered as the engine control in which the knocking is increased or decreased.

In the engine control in which the knocking is increased or decreased, the thermal efficiency of the engine is generally increased when the engine is controlled in a direction in which the knocking is increased. For example, when the ignition timing is advanced in the knock operation region, the ignition timing approaches the MBT, and thus the thermal efficiency increases. In addition, when the compression ratio is increased, the exhaust loss is reduced, so that the thermal efficiency is increased. Furthermore, when the cooling water temperature is increased, the cooling loss is reduced, and thus the thermal efficiency is increased.

When the background sound is small, if the current engine operating point A is changed to the engine operating point B1 at which the engine rotation speed is low and the engine torque is high, the tolerance for knocking is reduced.

Therefore, by performing the engine control for reducing knocking, the tolerance for knocking is expanded, and the engine operating point can be set at a low engine rotation speed. As a result, it is possible to further reduce the engine noise under an environmental condition where the background sound in which the engine sound becomes relatively noticeable is small.

On the other hand, when the background sound is large, if the current engine operating point A is changed to the engine operating point B2 at which the engine rotation speed is high and the engine torque is low, the tolerance for knocking increases. Therefore, by performing the engine control for increasing knocking, the thermal efficiency of the engine can be increased without exceeding the knock allowable limit value Li, and the carbon dioxide emission amount and the fuel cost can be reduced.

Examples of the parameter that determines the physical quantity correlated with the background sound, that is, the magnitude of the background sound include a vehicle speed (influence of road noise and wind noise), an air-conditioned air volume in the vehicle interior, a volume of an acoustic device, and an opening degree of a vehicle window.

Figure 22:
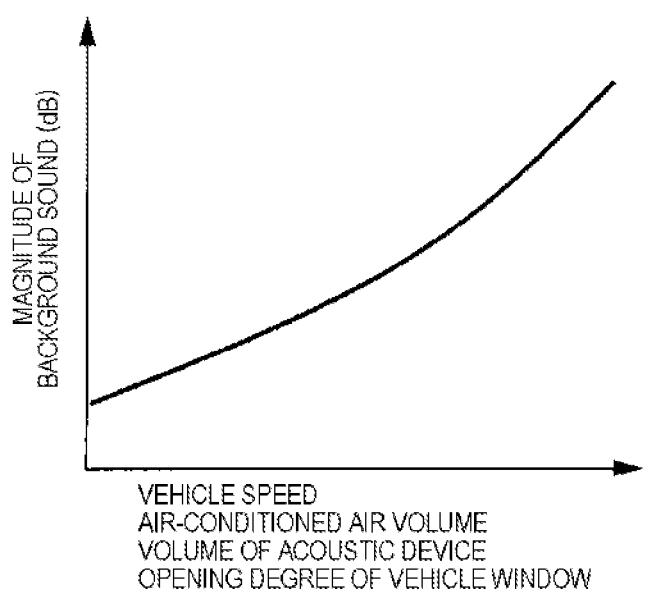
FIG. 22 is a characteristic diagram illustrating an example of correlation between a parameter for determining a background sound and the background sound.

FIG. 22 is a characteristic diagram illustrating an example of a correlation between a parameter for determining the background sound and the background sound. In FIG. 22, the horizontal axis represents each parameter for determining the background sound, and the vertical axis represents the magnitude (dB) of the background sound. From the correlation illustrated in FIG. 22, at least any one of the vehicle speed, the air-conditioned air volume, the volume of the acoustic equipment, and the opening degree of the vehicle window, or a combination of two or more parameters among these parameters may be used as the index value representing the magnitude of the background sound to determine the engine operating point. By using two or more parameters in combination as the parameter indicating the correlation with the background sound, more accurate engine operating point control can be performed.

For example, the vehicle speed is obtained based on the engine rotation speed, the speed increasing ratio of the speed increasing gear 2, the effective radius of the wheel, and the like. The air-conditioned air volume is obtained from the set air volume for the air conditioner. Further, the volume (sound pressure level) of the acoustic equipment is obtained from the set volume for the acoustic equipment. Further, the opening degree of the vehicle window is obtained from information of a set opening degree input to an opening meter (not illustrated) or an operation panel.

As described above, in a case where the background sound or the physical quantity correlated with the background sound is small, the control unit (control unit 122A) according to the modification of the present embodiment is configured to change the engine operating point (A) in a direction in which the engine rotation speed decreases and a direction in which the engine torque increases, and perform control to reduce knocking on the engine (1). In addition, when the background sound or the physical quantity correlated with the background sound is large, the control unit is configured to change the engine operating point (A) in a direction in which the engine rotation speed increases and a direction in which the engine torque decreases, and perform control to increase knock on the engine (1).

5. Fifth Embodiment

In the fourth embodiment, the engine operating point is controlled on the basis of the magnitude of the background sound (or the physical quantity correlated with the background sound), but the engine operating point may be determined on the basis of the operation mode set by the user instead of the magnitude of the background sound or the like. This control method will be described in detail as a fifth embodiment of the invention.

Figure 23:
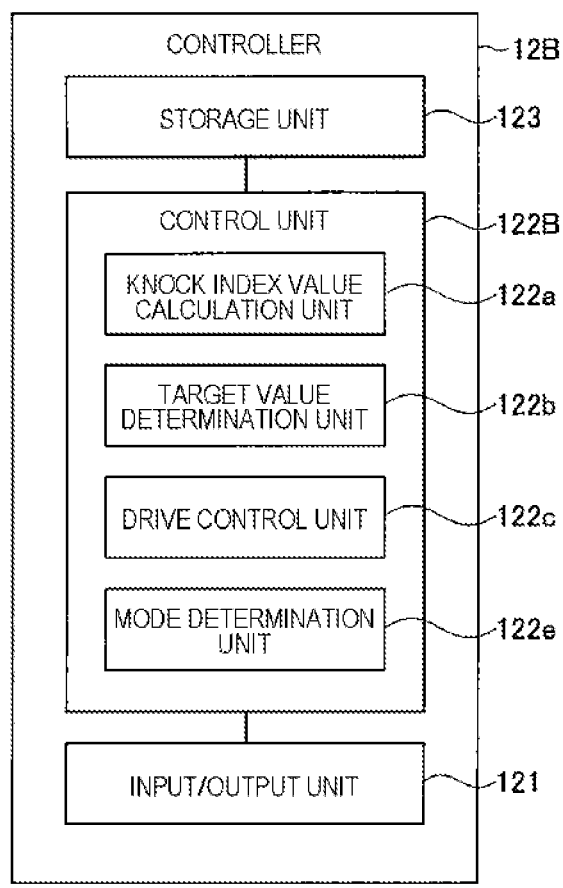
FIG. 23 is a block diagram illustrating a configuration example of a controller according to a fifth embodiment of the invention.

FIG. 23 is a block diagram illustrating a configuration example of a controller according to the fifth embodiment. As illustrated in FIG. 23, the controller 12B of the present embodiment includes an input/output unit 121, a control unit 122B, and a storage unit 123. The control unit 122B includes a mode determination unit 122e for the control unit 122 of the first embodiment (FIG. 3). The control unit 122B will be described mainly focusing on differences from the first embodiment.

The mode determination unit 122e determines an operation mode input by an occupant using an operation panel or an operation switch (not illustrated) installed in the vehicle, and outputs a determination result to the target value determination unit 122b.

In the present embodiment, as the operation mode, there are a mode in which silent is prioritized and a mode in which fuel efficiency is prioritized, but the invention is not limited to this example. In addition to the silent priority mode, there may be two or more operation modes.

The target value determination unit 122b determines the target engine rotation speed and the target engine torque according to the operation mode received from the mode determination unit 122e. Here, the target value determination unit 122b refers to the knock index value of the engine 1 calculated by the knock index value calculation unit 122a, and determines the target engine rotation speed and the target engine torque in the target power generation amount within a range in which the knock index value does not exceed the knock allowable limit Li.

Figure 24:
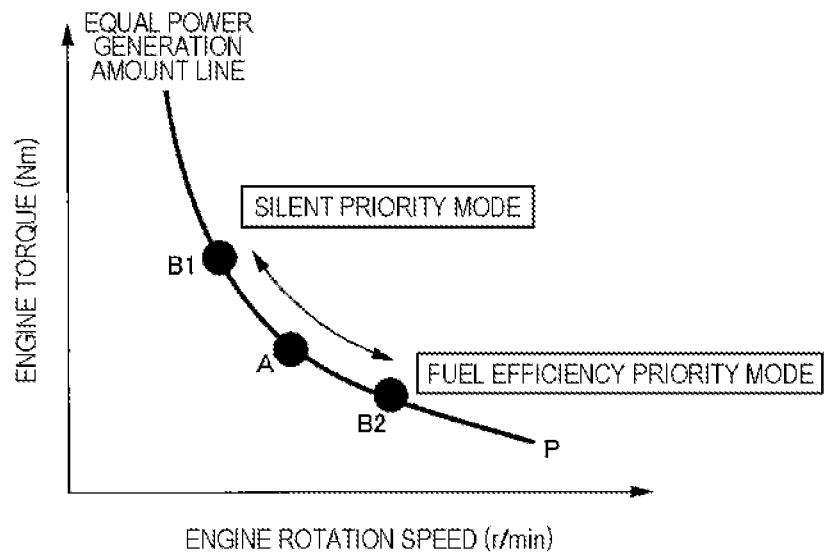
FIG. 24 is an explanatory diagram illustrating an example of changing an engine operating point on an equal power generation amount line according to an operation mode according to the fifth embodiment of the invention.

FIG. 24 illustrates an example in which the engine operating point on the equal power generation amount line is changed according to the operation mode according to the fifth embodiment. In FIG. 24, the horizontal axis represents the engine rotation speed (r/min), and the vertical axis represents the engine torque (Nm).

In the present embodiment, it is configured such that the user can select either the silent priority mode or the fuel efficiency priority mode, and information indicating the selected state is input to the controller 12B. When the silent priority mode is selected, the target value determination unit 122b changes the current engine operating point A to the engine operating point B1 at which the engine rotation speed is low and the engine torque is high.

On the other hand, when the fuel efficiency priority mode is selected, the target value determination unit 122b changes the current engine operating point A to the engine operating point B2 at which the engine rotation speed is high and the engine torque is low. At this time, the combination of the target engine rotation speed and the target engine torque is determined such that the product of the target engine rotation speed and the target engine torque is constant, that is, the power generation amount is constant (=P).

As described above, the hybrid vehicle control device (controller 12) according to the fifth embodiment is a hybrid vehicle control device that controls a hybrid vehicle (hybrid vehicle 50) including a motor (induction motor 7) that drives wheels, a generator (induction generator 3) that supplies electric power to the motor, and an engine (engine 1) configured by an internal combustion engine that drives the generator, and includes a control unit (control unit 122B) that calculates a knock index value indicating a knock degree of the engine at an engine operating point (A) represented by a relationship between an engine rotational speed and engine torque, and controls the engine rotational speed and the engine torque based on the knock index value. The control unit is configured to set the target engine rotation speed and the target engine torque in the target power generation amount (P) according to the selected operation mode (for example, the silent priority mode or the fuel efficiency priority mode) within a range in which the knock index value does not exceed the knock allowable limit value (Li).

According to the fifth embodiment described above, when the silent priority mode is selected, the engine rotation speed is set to be low in the target power generation amount within a range in which the knock index value does not exceed the knock allowable limit value, so that the engine noise can be kept low. On the other hand, according to the present embodiment, when the fuel efficiency priority mode is selected, the engine torque is set to be low in the target power generation amount within a range in which the knock index value does not exceed the knock allowable limit value. Therefore, the required throttle opening is reduced (see FIG. 5), and the fuel efficiency is improved. Furthermore, since the engine rotation speed is set to be high, the risk of knocking can be reduced.

As described above, in the present embodiment, it is possible to flexibly adjust the quietness and the fuel efficiency performance to the user's taste and situation at that time within a range in which the knock index value does not exceed the knock allowable limit value, so that it is possible to provide comfort and economy in a well-balanced manner according to the user's desire.

Modifications

Also in the present embodiment, similarly to the fourth embodiment, in the case of the silent priority mode, engine control for reducing knocking may be performed in addition to changing the current engine operating point A to the engine operating point B1 at which the engine rotation speed is low and the engine torque is high. On the other hand, in the case of the fuel efficiency priority mode, engine control for increasing knocking may be performed in addition to changing the current engine operating point A to the engine operating point B2 at which the engine rotation speed is high and the engine torque is low.

As described above, when the silent priority mode is selected as the operation mode, the control unit (the control unit 122B) according to the modification of the present embodiment is configured to change the engine operating point (A) to a direction in which the engine rotation speed decreases and the engine torque increases, and perform control to reduce knocking on the engine (1). Further, when the fuel efficiency priority mode is selected as the operation mode, the control unit is configured to change the engine operating point (A) to a direction in which the engine rotation speed increases and the engine torque decreases, and perform engine control in which knocking increases with respect to the engine (1).

The effect obtained by performing the knock increase/decrease control in the modification of the present embodiment is the same as the effect of the modification of the fourth embodiment.

Although an example has been described in which the engine operating point is changed in the same operation mode when the silent priority mode or the fuel efficiency priority mode is selected in FIG. 24, the invention is not limited to this example. For example, the present embodiment may be applied to the case of switching from the silent priority mode to the fuel efficiency priority mode or from the fuel efficiency priority mode to the silent priority mode. Alternatively, as the operation mode, there may be a standard mode in which quietness and fuel efficiency performance are balanced. In this case, the present embodiment is applied when the operation mode is switched from the standard mode to another operation mode (silent priority mode and fuel efficiency priority mode) or from another operation mode to the standard mode.

6. Sixth Embodiment

The method for controlling the engine operating point according to the fourth embodiment described above can be applied not only to a case where the target power generation amount is the same before and after changing of the engine operating point but also to a case where the target power generation amount is different.

That is, the method (see FIG. 21) for changing the engine operating point according to the magnitude of the background sound (or the physical quantity correlated with the background sound) according to the fourth embodiment may be applied to the engine operating point control (see FIG. 12) at the time of switching the power generation amount according to the first embodiment. This control method will be described in detail as a sixth embodiment of the invention.

Figure 25:
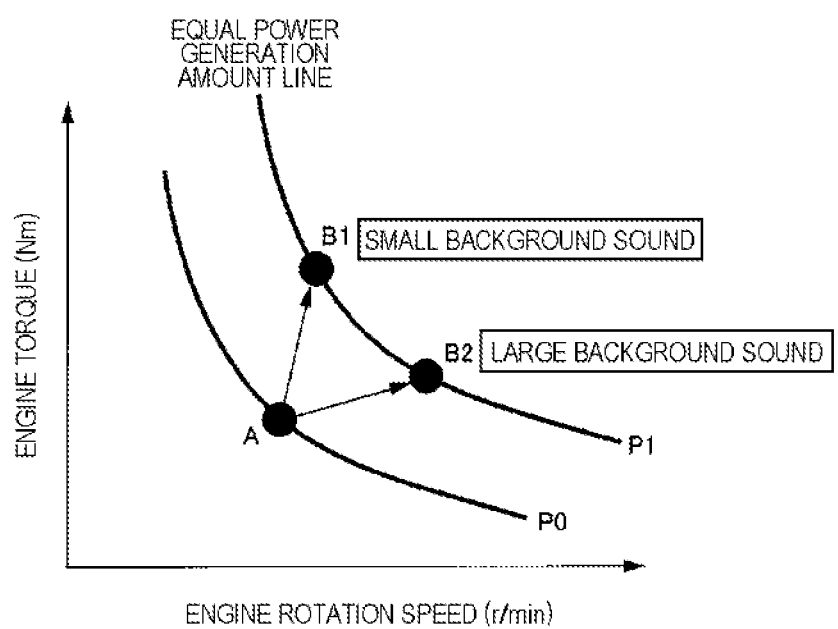
FIG. 25 is an explanatory diagram illustrating an example in which the fourth embodiment is applied to the first embodiment as a sixth embodiment of the invention.

FIG. 25 is an explanatory diagram illustrating an example in which the method for changing the engine operating point according to the magnitude of the background sound according to the fourth embodiment is applied to the engine operating point control at the time of switching the power generation amount according to the first embodiment as the sixth embodiment. In FIG. 25, the horizontal axis represents the engine rotation speed (r/min), and the vertical axis represents the engine torque (Nm).

In the present embodiment, when the current background sound in the power generation amount P0 is small, the current engine operating point A is changed to the engine operating point B1 at which the engine rotation speed is low and the engine torque is high on the equal power generation amount line of the changed power generation amount P1. On the other hand, when the current background sound in the power generation amount P0 is large, the current engine operating point A is changed to the engine operating point B2 at which the engine rotation speed is high and the engine torque is low on the equal power generation amount line of the changed power generation amount P1. At this time, the combination of the target engine rotation speed and the target engine torque is determined such that the product of the target engine rotation speed and the target engine torque is constant, that is, the power generation amount is constant (=P1) within a range in which the knock index value does not exceed the knock allowable limit value (Li).

According to the sixth embodiment described above, when the background sound is small, the engine rotation speed after the switching of the power generation amount is set to be low, so that the engine noise can be kept low.

On the other hand, according to the present embodiment, when the background sound is large, the engine rotation speed is set in a direction in which the engine rotation speed after the power generation amount is switched is increased, so that the risk of knocking can be reduced. Further, in a case where the background sound is large, even if the engine rotation speed increases, the decrease in comfort due to engine noise is small.

7. Seventh Embodiment

The method for controlling the engine operating point according to the fifth embodiment described above can be applied not only to a case where the target power generation amount is the same before and after changing of the engine operating point but also to a case where the target power generation amount is different.

That is, the method (see FIG. 24) for changing the engine operating point according to the operation mode according to the fifth embodiment may be applied to the engine operating point control (see FIG. 12) at the time of switching the power generation amount according to the first embodiment. This control method will be described in detail as a seventh embodiment of the invention.

In the present embodiment, when the operation mode is the silent priority mode, the current engine operating point A at the power generation amount P0 is changed to the engine operating point B1 at which the engine rotation speed is low and the engine torque is high on the equal power generation amount line of the changed power generation amount P1. On the other hand, when the operation mode is the silent priority mode, the current engine operating point A in the power generation amount P0 is changed to the engine operating point B2 at which the engine rotation speed is high and the engine torque is low on the equal power generation amount line of the changed power generation amount P1. At this time, the combination of the target engine rotation speed and the target engine torque is determined such that the product of the target engine rotation speed and the target engine torque is constant, that is, the power generation amount is constant (=P1) within a range in which the knock index value does not exceed the knock allowable limit value Li.

According to the seventh embodiment described above, when the silent priority mode is selected, the engine rotation speed after the power generation amount is switched is set to be low, so that the engine noise can be kept low. On the other hand, according to the present embodiment, when the fuel efficiency priority mode is selected, the engine torque after the switching of the power generation amount is set to be low, so that the necessary throttle opening is decreased (see FIG. 5), and the fuel efficiency is improved. Furthermore, since the engine rotation speed is set to be high, the risk of knocking can be reduced.

Further, the invention is not limited to each of the above-described embodiments, and it goes without saying that various other application examples and modifications can be taken without departing from the gist of the invention described in the claims.

For example, the above-described embodiments describe the configuration of the hybrid system in detail and specifically in order to describe the invention in an easy-to-understand manner, and are not necessarily limited to those including all the described components. In addition, a part of the configuration of one embodiment can be replaced with a component of another embodiment. Further, it is possible to add the components of one embodiment to the configuration of another embodiment. In addition, some of the components of each embodiment may be omitted, replaced with other configurations, and added to other configurations.

In addition, some or all of the configurations, functions, and processing units of the controller 12 may be realized in hardware such as an integrated circuit.

REFERENCE SIGNS LIST

1 engine
3 induction generator
5 battery
7 induction motor
10 knock sensor
11 crank angle sensor
12,12A,12B controller
17 ignition plug
122,122A,122B control unit
121 input/output unit
122*a* knock evaluation value calculation unit
122*b* target value determination unit
122*c* drive control unit
122*d* background sound calculation unit
122*e* mode determination unit
123 storage unit

The invention claimed is:

1. A hybrid vehicle control device for controlling a hybrid vehicle which includes a motor that drives a wheel, a generator that supplies electric power to the motor, and an engine that is configured by an internal combustion engine for driving the generator, comprising:
a control unit that calculates a knock index value indicating a knock degree of the engine at an engine operating point expressed by a relationship between an engine rotation speed and engine torque, and controls the engine rotation speed and the engine torque based on the knock index value,
wherein the control unit sets a target engine rotation speed to be low and target engine torque to be high in a target power generation amount as the knock index value decreases within a range in which the knock index value does not exceed a knock allowable limit value.

2. The hybrid vehicle control device according to claim 1, wherein the control unit determines the target engine rotation speed and the target engine torque such that a product of the target engine rotation speed and the target engine torque becomes constant according to the target power generation amount.

3. The hybrid vehicle control device according to claim 2, wherein the target engine rotation speed has a positive correlation with the knock index value,
wherein a storage unit that stores engine characteristics in which the target engine torque has a negative correlation with the knock index value is included, and
wherein the control unit determines the target engine rotation speed and the target engine torque based on the engine characteristics stored in the storage unit.

4. The hybrid vehicle control device according to claim 3, wherein the storage unit stores in advance default setting information in which a transition from an engine operating point in a first target power generation amount to an engine operating point in a second target power generation amount is set, and
wherein, when the engine operating point is changed between the first target power generation amount and the second target power generation amount, the control unit determines the engine rotation speed at the engine operating point after changing to be a high value and determines the engine torque to be a small value as compared with the case of the engine operating point at the second target power generation amount set in the default setting information.

5. The hybrid vehicle control device according to claim 2, wherein, when the target power generation amount is switched, the knock index value is a value obtained in an engine operating state before the target power generation amount is switched.

6. The hybrid vehicle control device according to claim 3, wherein, when the target power generation amount is the same at the engine operating point before changing and the engine operating point after changing, the control unit determines the target engine rotation speed and the target engine torque based on the knock index value with reference to the engine characteristics.

7. The hybrid vehicle control device according to claim 1, wherein the control unit lowers a rotation speed of the engine while referring to the knock index value on a same power generation amount line so as to bring the engine operating point close to an engine operating point of a knock allowable limit.

8. The hybrid vehicle control device according to claim 1, wherein the internal combustion engine is a spark ignition engine.

9. The hybrid vehicle control device according to claim 1, wherein the knock index value corresponds to a number of times of occurrence of knock within a predetermined time, a maximum amplitude of vibration within a predetermined period, or an average amplitude of vibration within a predetermined period.

* * * * *